Feb. 13, 1951 C. H. SPARKLIN 2,541,121
APPARATUS FOR TESTING ELECTRIC HEATING DEVICES
Filed Nov. 9, 1946 2 Sheets-Sheet 1
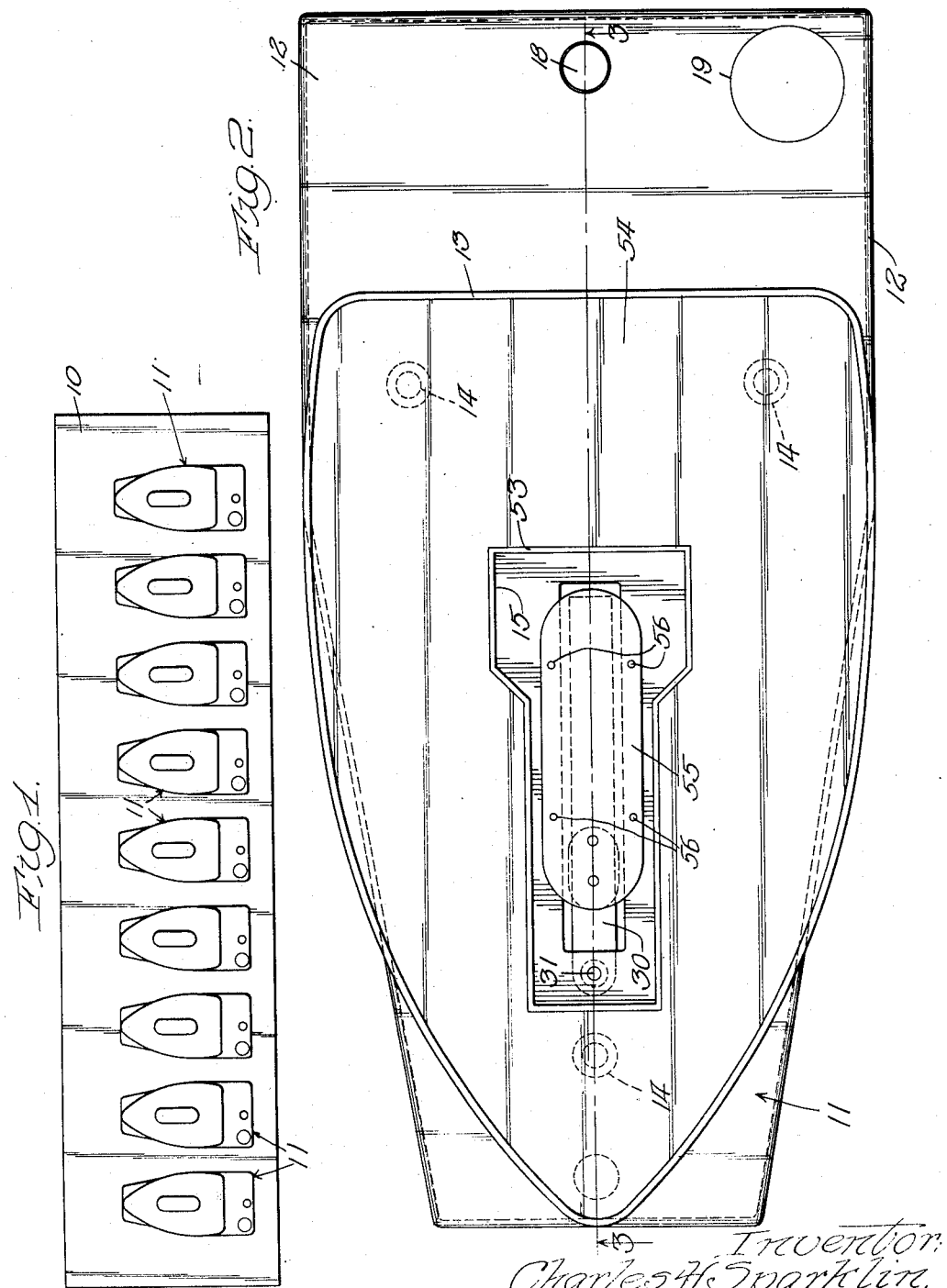

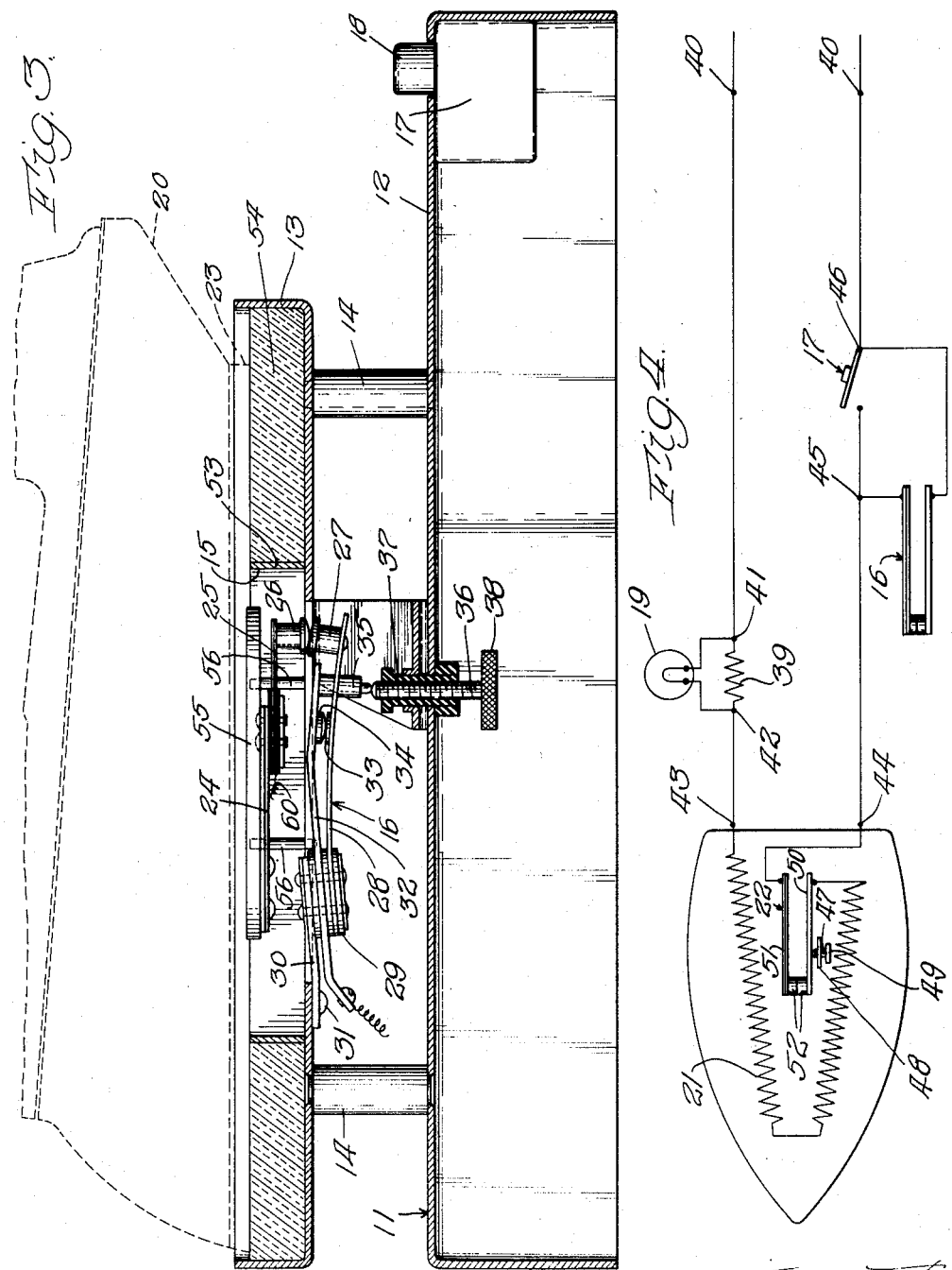

Patented Feb. 13, 1951

2,541,121

UNITED STATES PATENT OFFICE 2,541,121

APPARATUS FOR TESTING ELECTRIC HEATING DEVICES

Charles H. Sparklin, Chicago, Ill., assignor to Birtman Electric Company, a corporation of Illinois Application November 9, 1946, Serial No. 708,859

10 Claims. (Cl. 73—1)

This invention relates to apparatus for testing the temperature responsive switch of an electric heating device wherein said switch is provided in series with an electric heating element. It relates particularly to apparatus for testing and adjusting said switch and to a method of testing and adjusting said switch.

Various electric heating devices employ a temperature responsive switch in series with an electric heating element to control the temperature of the heating element. During the manufacture of these devices, it is necessary that the switches be tested in order to insure their proper operation and adjusting where this adjustment is necessary. This operation has heretofore been somewhat complicated and time-consuming and not completely satisfactory for a number of reasons.

With the apparatus and method of the present invention the temperature responsive switch, as well as the electric heating element, may be easily and conveniently tested and the switch may be readily adjusted where such adjustment is necessary. The testing of each device requires only a few seconds of time and the testing is quite accurate and uniform for a whole series of devices. The apparatus comprises broadly an electric signalling device, a temperature responsive switch set at a desired temperature and in series with each other and with the switch of the electric heating device and the heating element to provide a circuit, a manually operable switch in parallel with the temperature responsive device, and a source of electric power normally connected to the circuit. The temperature responsive device is arranged to interrupt the circuit when the temperature exceeds the certain predetermined value and is located adjacent the heating element during the testing operation in order to receive heat therefrom. During the testing, the manually operable switch is kept open until the temperature responsive device has interrupted the current in the electric circuit. It is preferred that means be provided for changing the setting of the temperature responsive device and that means be provided for adjusting the switch in the unit being tested, so that it may be readily changed to the desired temperature setting. In the preferred operation of the testing apparatus, the switch in the device being tested is set at a temperature higher than that of the temperature responsive device. Electric current is caused to flow through the circuit until the heating element has reached a temperature corresponding to the setting of the temperature responsive device. As soon as this temperature has been reached, the circuit is interrupted. After the temperature regulation has stabilized the normally open manually operable switch is closed to again set up the circuit with the flow of current being indicated at all times by the signalling device. As soon as the manually operable switch has been closed, the temperature responsive switch in the device being tested is adjusted until the circuit is again broken. At this point, the switch in the device being tested will have substantially the same temperature setting as the temperature responsive device in the apparatus.

The invention will be described as related to the embodiment shown in the accompanying drawings. Of the drawings, Fig. 1 is a plan view of an assembly of a series of units for testing electric irons; Fig. 2 is a plan view of one of the testing units; Fig. 3 is a vertical section taken along line 3—3 of Fig. 2; and Fig. 4 is a diagrammatic view showing the electrical circuit of one unit of the testing apparatus.

The different units of the testing apparatus are preferably arranged in groups that are convenient to the operator. As shown in Fig. 1, the series of units are arranged on a table 10. In other forms, the units may be arranged on an arcuate table or may be arranged on a circular table adapted to revolve around its center. Other arrangements may, of course, be used. Each unit of the testing apparatus comprises a base 12, a raised platform 13 thereon having the shape of a sole plate of the electric iron being tested, and supported on spaced posts 14, a central opening 15 in the platform, a thermostat operated switch 16 disposed in the opening 15, a manually operable switch 17 at one end of the base 12 having a button 18 extending above the base, and a signalling light 19 also arranged at one end of the base 12. The electric iron 20 which is to be tested includes a heating element 21 in series with a temperature responsive switch 22. The heating element 21 and switch 22 are located within the iron 20 and the switch 22 is preferably positioned just above the sole plate 23 and the control switch 16 is located opposite switch 22 and adjacent the heating element 21.

The control switch 16 comprises a bimetal strip 24 located in the opening 15 and normally adjacent the sole plate 23 when the iron is in position in order to receive heat directly from the sole plate. The bimetal strip 24 is riveted to a very thin bimetal strip 25 having a downwardly extended post 26 attached to its free end. This post 26 bears against a second post 27, which is fastened to a metal strip 28. This second metal strip is preferably of a flexible spring steel or a similar material. The other end of this strip is held in an insulated block 29 that is fastened by means of an arm 30 and a rivet 31 to the platform 13. Arranged approximately parallel to the metal strip 28 is a bar 32. This bar also has one end held in the block 29 and is insulated from the metal strip 28. The strip 28 is provided with a contact point 33 arranged to bear against a second contact point 34 on the bar 32. The free end of the bar 32 is provided with a downwardly extending stud 35 bearing against a threaded rod 36 that is held in a threaded insulated mounting 37. The rod 36 is provided with a thumb screw lower end 38 so that it may be turned to adjust the setting of the thermostat control switch 16. The thumb screw 38 is purposely located in a difficulty accessible place so that the operator will have difficulty in reaching it. This is done so that the setting of the switch 16 will not be accidentally changed. After the switch 16 has been set at one temperature, it need not be changed during the testing of the whole series of irons or like.

The electrical hookup of the testing unit is shown diagrammatically in Fig. 4. As shown, the electric light 19, the heating element 21, the temperature responsive switch 22 in the iron, and the control switch 16 are connected in the series to provide a circuit. The light 19 preferably has a small resistor 39 hooked up in parallel therewith. The manually operable switch 17 is connected in parallel across the control switch 16. The circuit is then adapted to be connected across a source of electric power in the terminals 40. In order to aid in making the circuit, the signalling light 19 and resistor 39 are provided with a pair of terminals 41 and 42. The electric iron is also provided with a pair of terminals 43 and 44 and the control switch 16 and manually operable switch 17 are provided with a pair of terminals 45 and 46.

Means are provided for adjusting the setting of the temperature responsive switch 22 in the electric iron. As shown, this means comprises a threaded post 47 engaging a similarly threaded mounting 48 and provided with a thumb screw head 49 on its free end. The post 47 normally bears against one arm 50 of the switch while the other arm 51 comprises an ordinary bimetal strip adapted to flex with changes in temperature. Each arm has a cooperative contact point 52.

When the circuit has been set up as shown in Fig. 4, the thermostat switch 22 in the iron is turned to a setting corresponding to a temperature higher than the setting of the control switch 16. The current is caused to flow through the circuit thereby causing the heat to build up in the sole plate 23. This heat is transferred to the bimetal strip 24 and when the temperature has risen to a point corresponding to the setting of the control switch 16, the flexing of the bimetal contributes to a separation of the contact points 33 and 34 and the interruption of the electrical circuit. At this point, the light 19 goes out. Then the manually operable switch 17 is closed to by-pass the control switch 16. This again sets up the flow of current through the circuit and causes the light 19 to glow. The thermostat switch 22 in the electric iron is then adjusted to the point where the light 19 is extinguished. At this point, the setting of the thermostat switch 22 is substantially the same as the setting of the control switch 16.

In order to aid in establishing the circuit the terminals 40 may be an ordinary two-terminal plug adapted to be inserted in a socket which is connected to the electric power line. The terminals 43 and 44 on the iron may be the ordinary electric cord that is commonly used with such irons and may be inserted in a plug containing the terminals 42 and 45. One terminal 40 may be more-or-less permanently connected to terminal 41 while the other terminal 40 may be likewise connected to terminal 46.

In order to prevent the dissipation of heat from sole plate 23, the platform 13 is preferably constructed with up-standing side portions while the opening 15 may have corresponding side portions 53. The space between the up-standing side portions at the edge of the platform and the portions forming the margin of opening 15 may be filled with an insulating material 54 such as asbestos.

In order to save time in the testing, it is preferred that a plurality of the testing units 11 be arranged together and convenient to the operator as illustrated in Fig. 1. Here each unit holds an iron and each iron is part of an electrical circuit as has been described. As soon as the irons have reached the proper temperature, the irons are tested and adjusted in turn. As soon as one iron has thus been tested and adjusted, it is removed and a new iron placed on its platform and connected to make an electrical circuit. Thus there need be no waiting for the irons to heat. Overheating of the irons is prevented due to the action of the control switch 16.

When electric current is flowing through a circuit, the current flows through the light 19, and resistor 39, through heating element 21, through the thin bimetal strip 25 as indicated at 60 (Fig. 3), posts 26 and 27, metal strip 28, contact points 33 and 34, metal bar 32, and on to the other side of the source of electric power. As can be seen in Fig. 3, the thin bimetal strip 25 is insulated from the bimetal 24. The bimetal 24 is located on the bottom surface of a flat plate 55, which is supported on posts 56. The contact post 26 has a rounded bottom resting on the flat top of the lower contact post 27. This insures perfect alignment between these posts at all times. The posts or their contact surfaces may be made of silver or other conducting material.

The switch 16 is caused to separate and interrupt the circuit by a combination of the heat received by the bimetal strip 24 from the sole plate 23 and the heat generated in the thin bimetal strip 25 by the current flowing through it. This heat is dependent on the product $I^2R$ where $I$ is the amperes of current and $R$ is the resistance of the thin bimetal 25. The resistance is made large so that the thin bimetal will be quite responsive. Both bimetal strips 24 and 25 curl downward when heated to break the contact in contact points 33 and 34. The function of the thin bimetal strip 25 is quite important as it prevents large cycles of operation and provides very close operation of the control switch 16. It provides almost a straight line function of time against temperature and permits very close adjustment of the switch 22 within the iron.

The manually operable switch 17 may be operated by the hand of the operator, the foot or by any other equivalent means. It is placed in a position where it can readily be closed by the operator at the proper time and is preferably made with a spring means that holds the switch normally open.

The control switch 16 provides a very small cycle of operation between its off position and its on position. This is true because of the leverage construction of the switch assembly. The thermostat switch in the electric iron has a broader cycle as this lever construction is not provided in this switch. The minimum temperature of the cycle of operation of the switch in the electric iron will be substantially the same as the minimum temperature of the cycle of the control switch. The maximum temperature, however, of the cycle of operation of the switch in the iron will be considerably higher than the maximum temperature in the cycle of the control switch.

Having described my invention as related to the embodiment shown in the accompanying drawings, it is my intention that the invention be not limited by any of the details or description unless otherwise specified, but rather be construed broadly within its spirit and scope as set out in the accompanying claims.

I claim:

1. Apparatus for testing the temperature responsive switch of an electric heating device in which said switch is in series with an electric heating element, said apparatus comprising: an electric signalling device actuated by electric current flowing therethrough; a preset independent temperature responsive switch arranged to open at said preset temperature, said signalling device and independent switch being adapted to be connected in series with each other and with said temperature responsive switch and heating element of the heating device to provide a circuit; a normally open manually operable switch in the circuit in parallel with the independent switch; a supporting structure on which said signalling device, independent switch and manually operable switch are mounted; and means for connecting said circuit to a source of electric power, said independent switch being positioned on the supporting structure to receive heat from said heating element during the testing operation.

2. The apparatus of claim 1 wherein the independent switch comprises a first bimetal strip and a second bimetal strip attached to each other in end-to-end relationship with one end of the first strip being anchored to said supporting structure, and the electrical circuit includes the second bimetal strip only of the two bimetal strips, said second bimetal strip being insulated from said first strip.

3. Apparatus for testing an adjustable temperature responsive switch of an electric heating device in which said switch is in series with an electric heating element, said apparatus comprising: an electric signalling device actuated by electric current flowing therethrough; a preset independent temperature responsive switch arranged to open at said preset temperature, said signalling device and independent switch being adapted to be connected in series with each other and with said adjustable switch and heating element of the heating device to provide a circuit; a normally open manually operable switch in the circuit in parallel with the independent switch; a supporting structure on which said signalling device, independent switch and manually operable switch are mounted; and means for connecting said circuit to a source of electric power, said independent switch including a bimetal strip in the electrical circuit heated by electric current passing therethrough and said independent switch being positioned on the supporting structure to receive heat from said heating element during the testing operation.

4. Apparatus for testing an adjustable temperature responsive switch of an electric heating device in which said switch is in series with an electric heating element, said apparatus comprising: an electric signalling device actuated by electric current flowing therethrough; a preset independent temperature responsive switch arranged to open at said preset temperature, said signalling device and independent switch being adapted to be connected in series with each other and with said adjustable switch and heating element of the heating device to provide a circuit; a normally open manually operable switch in the circuit in parallel with the independent switch; a supporting structure on which said signalling device, independent switch and manually operable switch are mounted; and a pair of terminals on said supporting structure defining the ends of said circuit for connecting the circuit to a source of electric power, said independent switch being positioned on the supporting structure to receive heat from said heating element during the testing operation.

5. Apparatus for testing an adjustable temperature responsive switch of an electric heating device in which said switch is in series with an electric heating element, said apparatus comprising: an electric signalling device actuated by electric current flowing therethrough; a preset independent temperature responsive switch arranged to open at said preset temperature, said signalling device and the independent switch being adapted to be connected in series with each other and with said adjustable switch and heating element of the heating device to provide a circuit; a normally open manually operable switch in the circuit in parallel with the independent switch; and a supporting structure on which said signalling device, independent switch and manually operable switch are mounted, said supporting structure including a platform for receiving the heating device during the testing operation with the independent switch located adjacent the surface of said platform to receive heat from said heating element.

6. The apparatus of claim 5 wherein said independent switch is arranged adjacent the heating element during the testing operation.

7. The apparatus of claim 5 wherein the surface of the platform is insulated except for a small area within which said independent switch is located.

8. Apparatus for testing an adjustable temperature responsive switch of an electric heating device in which said switch is in series with an electric heating element, said apparatus comprising: an electric signalling device actuated by electric current flowing therethrough; a preset independent temperature responsive switch arranged to open at said preset temperature, said signalling device and the independent switch being adapted to be connected in series with each other and with said adjustable switch and heating element of the heating device to provide a circuit; a normally open manually operable switch in the circuit in parallel with the independent switch; a supporting structure on which said signalling device, independent switch and manually operable switch are mounted, said supporting structure including a platform for receiving the heating device during the testing operation with the independent switch located adjacent the surface of said platform to receive heat from said heating element; and a pair of terminals on said supporting structure defining the ends of said circuit for connection to a source of electric power, said independent switch including a pair of bimetal strips having one end of each attached to and insulated from the other with the first of said strips being positioned to receive heat from said heating element and the second of said strips being in said circuit to be heated by electric current passing therethrough.

9. The apparatus of claim 8 wherein the first of said bimetal strips of the independent switch has one end immovably fixed and the other end attached to but insulated from one end of said second of the strips, the other end of said second strip carrying a portion of a make-and-break contact assembly also in said circuit.

10. Apparatus for testing an adjustable temperature responsive switch of an electric iron in which said switch is in series with an electric heating element, said apparatus comprising: an electric signalling device actuated by electric current flowing therethrough; a preset independent temperature responsive switch arranged to open at said preset temperature, said signalling device and the independent switch being adapted to be connected in series with each other and with said adjustable switch and heating element of the electric iron to provide a circuit; a normally open manually operable switch in the circuit in parallel with the independent switch; and a supporting structure on which said signalling device, independent switch and manually operable switch are mounted, said supporting structure including a platform for receiving the sole plate of the electric iron during the testing operation with the independent switch located adjacent the surface of said platform and opposite said electric iron switch during the testing operation, said platform being insulated except for the portion on which the independent switch is located, said independent switch including a first bimetal strip to receive heat from said heating element and a second bimetal strip in the electrical circuit to be heated by electric current passing therethrough, said first strip having one end immovably fixed to the supporting structure and the other end attached to but insulated from one end of said second of the strips, the other end of said second strip carrying a portion of a make-and-break contact assembly also in said circuit.

CHARLES H. SPARKLIN.

REFERENCES CITED

The following references are of record in the file of this patent:

UNITED STATES PATENTS

| Number | Name | Date |
|---|---|---|
| 1,664,221 | Matthews | Mar. 27, 1928 |
| 1,681,132 | Reynolds | Aug. 14, 1928 |
| 2,224,198 | Shearer | Dec. 10, 1940 |
| 2,405,270 | Riess | Aug. 6, 1946 |
| 2,447,580 | Kaumans | Aug. 24, 1948 |